United States Patent [19]

Wildgoose et al.

[11] Patent Number: 4,816,652

[45] Date of Patent: Mar. 28, 1989

[54] CURRENCY CASSETTE AND CASH DISPENSING SYSTEM INCLUDING SUCH CASSETTE

[75] Inventors: Ronald Wildgoose; John M. Kay, both of Dundee; James A. Blewett, Fife, all of Scotland

[73] Assignee: NCR Corporation, Dayton, Ohio

[21] Appl. No.: 167,938

[22] Filed: Mar. 14, 1988

[30] Foreign Application Priority Data

Sep. 22, 1987 [GB] United Kingdom ................. 8722324

[51] Int. Cl.[4] ............................................. G06F 15/30

[52] U.S. Cl. .................................................... 235/379

[58] Field of Search .......................................... 235/379

[56] References Cited

U.S. PATENT DOCUMENTS

| | | | |
|---|---|---|---|
| 3,914,579 | 10/1975 | Shigemori et al. | 235/61.7 B |
| 4,113,140 | 9/1978 | Graef et al. | 221/6 |
| 4,221,376 | 9/1980 | Handen et al. | 271/149 |
| 4,337,393 | 6/1982 | Hilton | 235/487 |
| 4,459,052 | 7/1984 | Lundblad | 235/379 |
| 4,517,451 | 5/1985 | Kokubo et al. | 235/379 |
| 4,523,753 | 6/1985 | Hiromori et al. | 271/31.1 |
| 4,524,268 | 6/1985 | Fukatsu | 235/379 |
| 4,546,240 | 10/1985 | Imamichi | 235/379 |
| 4,618,817 | 10/1986 | Yamauchi et al. | 271/9 |
| 4,638,746 | 1/1987 | Ishigure | 109/52 |
| 4,670,643 | 6/1987 | Hain et al. | 235/379 |
| 4,711,441 | 12/1987 | Taylor | 271/6 |

*Primary Examiner*—Harold I. Pitts
*Attorney, Agent, or Firm*—Wilbert Hawk, Jr.; Albert L. Sessler, Jr.

[57] ABSTRACT

A currency cassette (10) includes pusher means (26) arranged to urge a stack of currency notes towards an exit end of the cassette (10) from which notes are extracted when the cassette (10) is mounted in an associated cash dispensing means. A carrier member (68) carries a permanent magnet adapted to cooperate with a reed switch included in the cash dispensing means. The carrier member (68) is removably mounted in the pusher means (26) in a first position or a second position such that, in operation, the magnet operates the reed switch when the pusher means (26) reaches a first position or a second position relative to the exit end of the cassette (10), depending on the position in which the carrier member is mounted on the pusher means (26). Operation of the switch serves to provide a warning that the number of notes remaining in the cassette (10) has reached a predetermined first level or second level.

15 Claims, 6 Drawing Sheets

FIG. 5
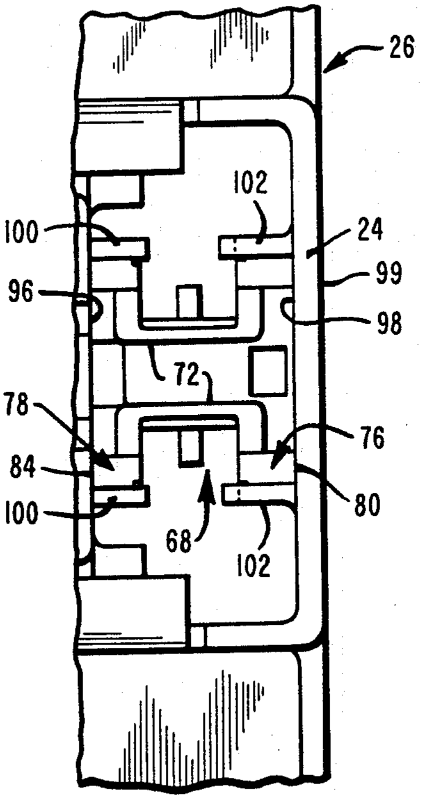
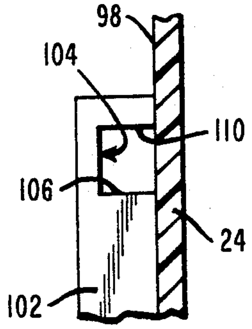
FIG. 6

FIG. 7
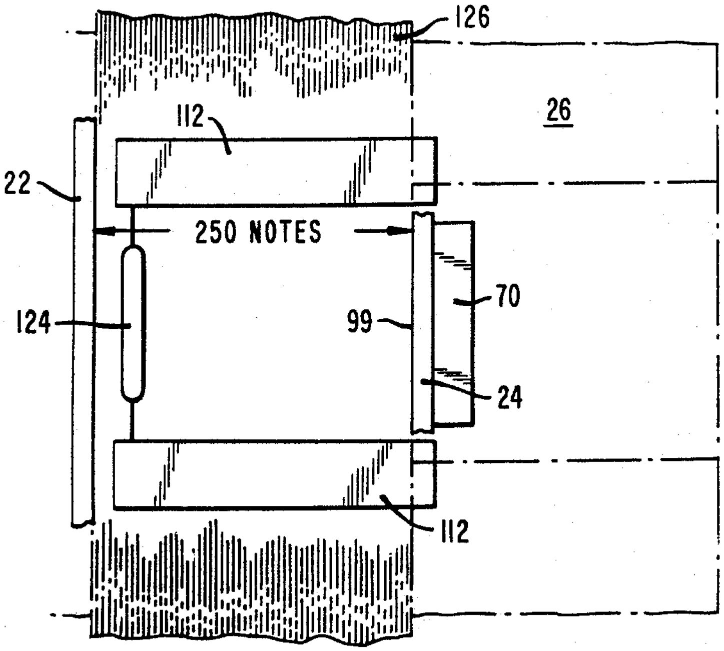
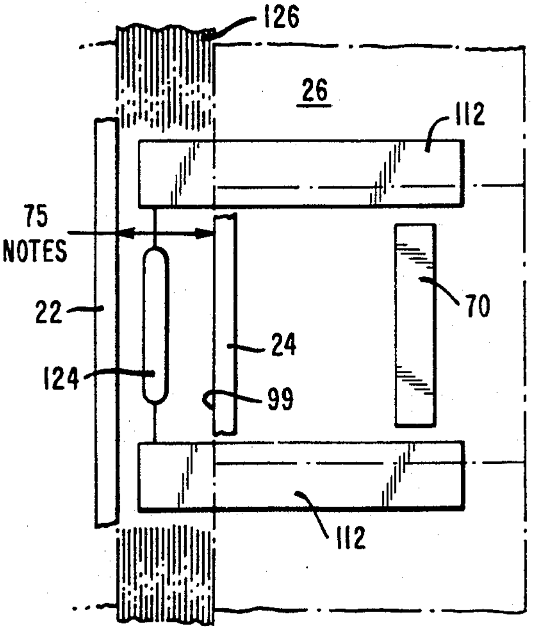
FIG. 8

CURRENCY CASSETTE AND CASH DISPENSING SYSTEM INCLUDING SUCH CASSETTE

BACKGROUND OF THE INVENTION

This invention relates to currency note containers of the kind used with cash dispensing machines. Such containers will hereinafter be referred to as-currency cassettes.

Currency cassettes are used, for example, in automated teller machines (ATMs) of the kind wherein a user inserts a customer identifying card into the machine and then enters certain data (such as codes, quantity of currency required, type of transaction, etc.,) upon one or more keyboards associated with the machine. The machine will then process the transaction, update the user's account to reflect the current transaction, dispense cash, when requested, extracted from one or more currency cassettes mounted in the machine, and return the card to the user as part of a routine operation.

In an ATM, it is desirable that an indication be given when the number of currency notes remaining in a currency cassette has reached a predetermined low level, so that arrangements can be made for the cassette to be replenished, or replaced by a ready-loaded cassette, prior to the cassette becoming exhausted of currency notes. A currency cassette having a low level indication feature enables the time for which an ATM employing the cassette is out of operation to be kept to a minimum.

A known currency cassette having a low level indication feature employs a permanent magnet incorporated in a pusher assembly for a stack of notes in the cassette, the magnet being arranged to cooperate with a magnetically operable reed switch mounted in a cash dispenser unit in which the cassette is adapted to be inserted. The reed switch is mounted so that when the cassette is fully inserted in the cash dispenser unit the switch is positioned adjacent the note exit end of the cassette. In operation, as notes are extracted from the exit end of the cassette, the pusher assembly carrying the permanent magnet moves towards the note exit end until eventually the magnetic field in the vicinity of the reed switch becomes sufficiently high to operate the switch. Operation of the switch can be utilized to provide an indication that the number of notes remaining in the cassette has reached a predetermined low level. This known cassette has the disadvantage that it is not possible to adjust the level at which a low level indication is given. Another disadvantage of this known cassette is that the magnet must reach a position fairly close to the reed switch before the switch is operated; in practice, this means that a low level indication is only given when a relatively few number of notes, say 75 notes, remain in the cassette.

SUMMARY OF THE INVENTION

In accordance with one embodiment of the invention, a currency cassette for containing a stack of currency notes, said cassette having an exit end through which said notes are dispensed and being adapted to be mounted in an operational position in a cash dispenser which has a magnetically operable switch for providing an indication of when the supply of bills in said cassette is low, comprises note support means for supporting a stack of currency notes; pusher means having a note engaging surface arranged to engage with and urge aid stack towards said exit end of said cassette from which currency notes are extracted one by one in operation when said cassette is in said operational position; magnet means capable of actuating said magnetically operable switch of the cash dispenser; and carrier means for carrying said magnet means and which is arranged to be removably mounted on said pusher means in a first position or a second position such that when said cassette is in said operational position, said magnet means operates said magnetically operable switch when said note engaging surface reaches either a first position or a second position relative to said exit end, depending upon the position in which said carrier means is mounted on said pusher means.

In accordance with another aspect of the invention, a cash dispensing system comprises a currency cassette for containing a stack of currency notes and having an exit end from which said notes are extracted, said cassette including note support means for supporting a stack of currency notes, pusher means having a note engaging surface arranged to engage with and urge said stack towards said exit end, magnet means, and carrier means carrying said magnet means and arranged to be removably mounted on said pusher means in a first position or a second position; and cash dispensing means including means for extracting currency notes one by one from the note exit end of said cassette when said cassette is mounted in an operational position in said cash dispensing means, and a magnetically operable switch operable by said magnet means of the currency cassette when said note engaging surface of said pusher means reaches a first position or a second position relative to said exit end, depending upon the position in which said carrier means is mounted on said pusher means, operation of said switch serving to bring about operation of low level indication means so as to provide a warning that the number of notes remaining in said cassette has reached a predetermined first level or second level.

It is accordingly an object of the present invention to provide a currency cassette having a low level indication feature in which the level at which a low level indication is given can be readily changed.

It is a further object of the invention to provide a currency cassette having a low level indication feature which has the capability of providing a low level indication at a level significantly greater than that of the aforementioned known currency cassette.

BRIEF DESCRIPTION OF THE DRAWINGS

One embodiment of the invention will now be described by way of example with reference to the accompanying drawings, in which:

FIG. 5 is a plan view of part of a pusher assembly of the currency cassette showing the magnet carrier member mounted in the pusher assembly;

FIG. 6 is a part sectional, side elevational view of part of the pusher assembly shown in FIG. 5;

FIG. 7 is a schematic plan view of parts of the currency cassette illustrating a first mode of operation of a low level indication feature of the cassette;

FIG. 8 is a schematic plan view of parts of the currency cassette illustrating a second mode of operation of the low level indication feature.

DESCRIPTION OF THE PREFERRED EMBODIMENT

Figure 1:
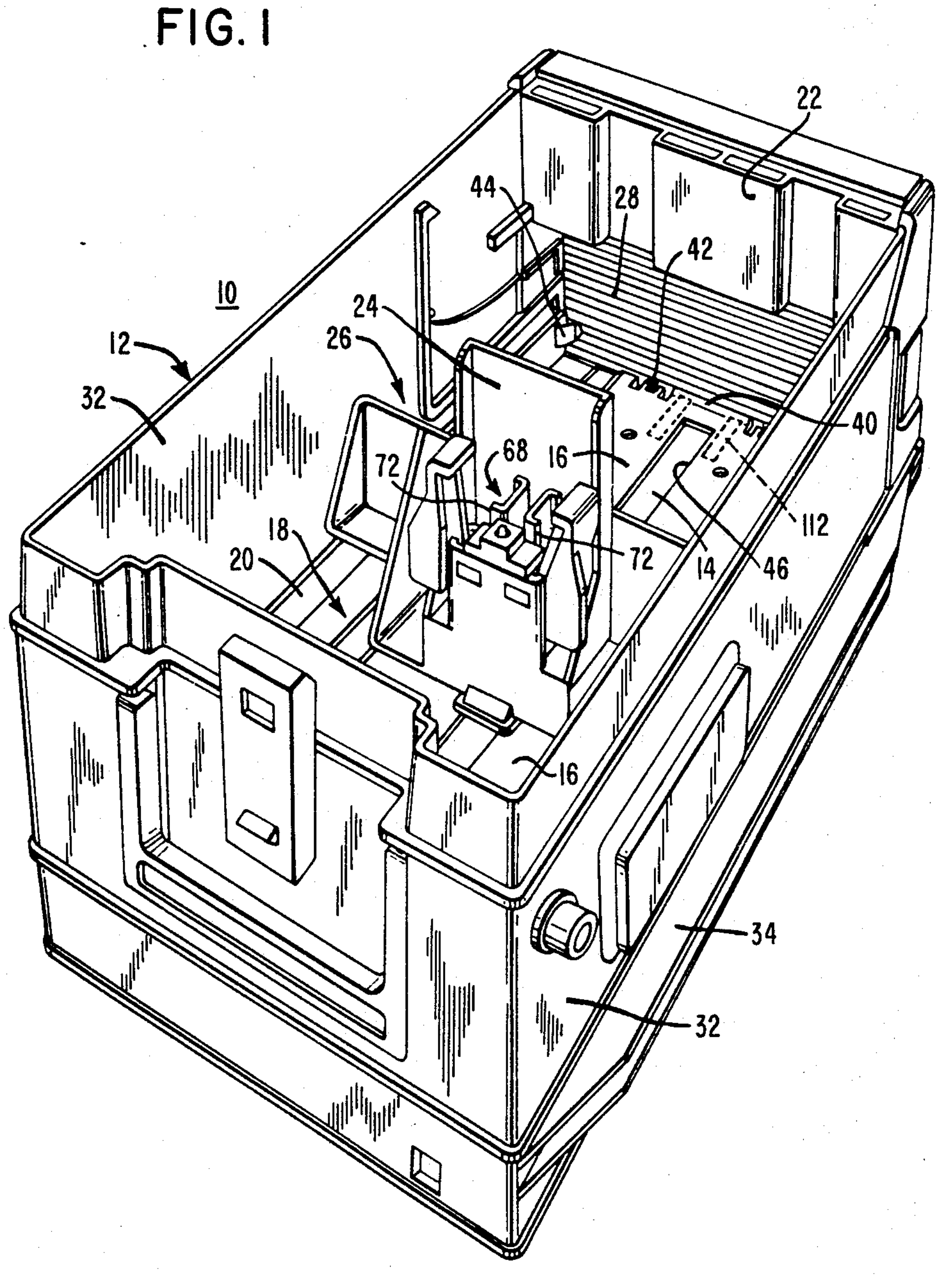
FIG. 1 is a perspective view of a currency cassette in accordance with the invention, with the lid removed.

Referring first to FIG. 1, the currency cassette 10 shown therein includes a generally rectangular receptacle 12 for currency notes, the top of the receptacle 12 being provided with a lockable lid (not shown). Mounted within the receptacle 12 adjacent the base 14 thereof is an elongated note support member 16 of plastic material which has a planar upper surface and which is spaced a short distance from the base 14. Two side note guide members 18 (only one of which is seen) are adjustably attached to the base 14 whereby the spacing apart of two vertical guide portions 20 respectively forming part of the guide members 18 may be adjusted to correspond to the lengths of the currency notes which the cassette 10 is intended to hold. The cassette 10 is adapted to hold a stack of notes with corresponding long edges of the notes resting on the support member 16 and extending between the vertical guide portions 20, and with the stack extending between an upper note retaining member 22 positioned at the rear (exit) end of the receptacle 12 and a pusher plate 24 of a pusher assembly 26 of plastic material. The pusher plate 24 is arranged to urge the stack of notes towards the retaining member 22 with an upper portion of the first note in the stack being pressed against the member 22. In operation, currency notes are extracted one by one from the cassette 10 through an opening in the rear end of the receptacle 12, this opening being normally closed by a slatted shutter 28. As will be explained later, the cassette 10 has a low level indication feature for indicating when the number of notes remaining in the cassette 10 has reached a preselected low level.

Figure 2:
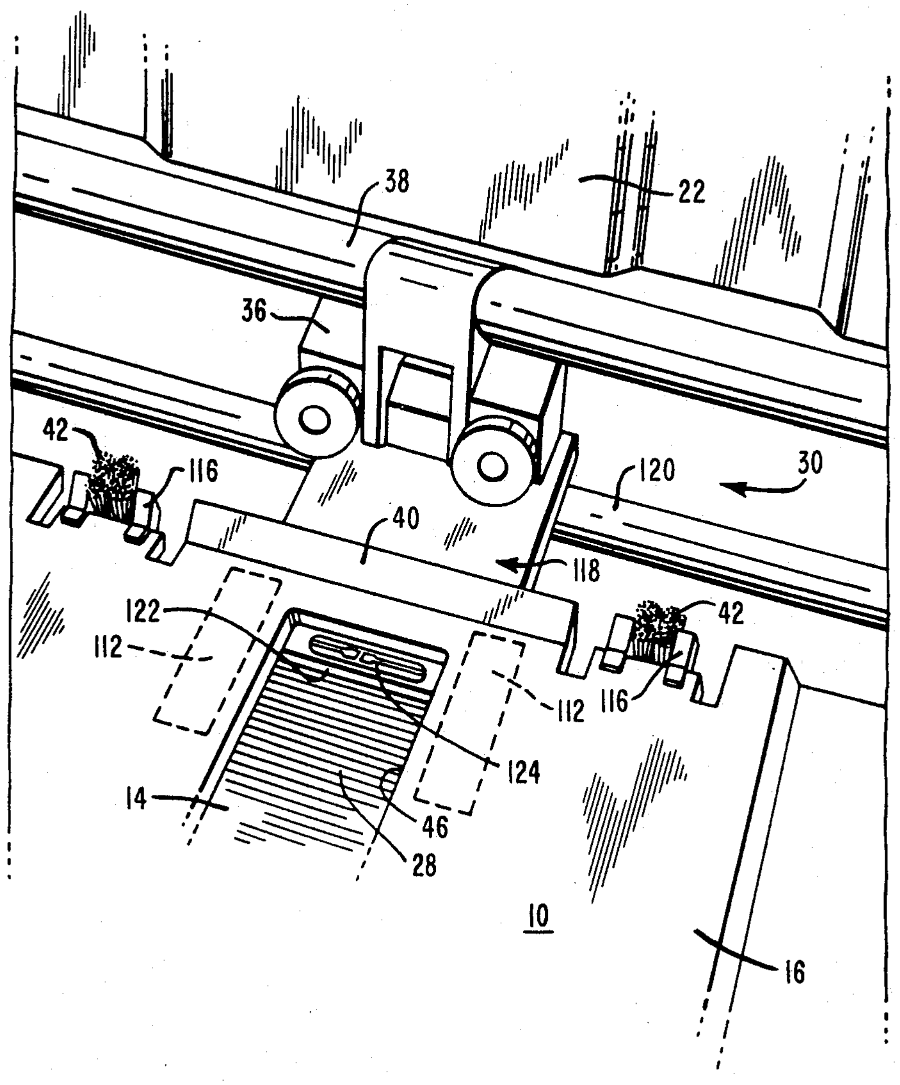
FIG. 2 is an enlarged perspective view of part of the currency cassette of FIG. 1 and part of a cash dispenser unit in which the cassette is inserted.

Referring now additionally to FIG. 2, the cassette 10, when loaded with currency notes and having its lid locked in a closed condition, is adapted to be inserted into a cassette receiving compartment of a cash dispenser unit 30 of an ATM. The cassette 10 is provided on its side walls 32 (FIG. 1) with longitudinally extending guide members 34 which are arranged to engage with cooperating guide means (not shown) provided in the cassette receiving compartment. During the insertion of the cassette 10 into the cassette receiving compartment, the shutter 28 is automatically moved by actuating means (not shown) incorporated in the cash dispenser unit 30 to a retracted position as shown in FIG. 2, the shutter 28 in this position being located between the base 14 and the note support member 16.

In operation of the ATM, currency notes are extracted from the cassette 10 by a conventional vacuum operated pick assembly 36 mounted on a shaft 38. Prior to the first note in the stack of currency notes in the cassette 10 being extracted by the pick assembly 36, the lower portion of this note is retained in position by a lip 40 and brushes 42 projecting upwardly from the rear end of the support member 16 and by leaf springs 44 attached to the vertical guide portions 20.

Figure 3:
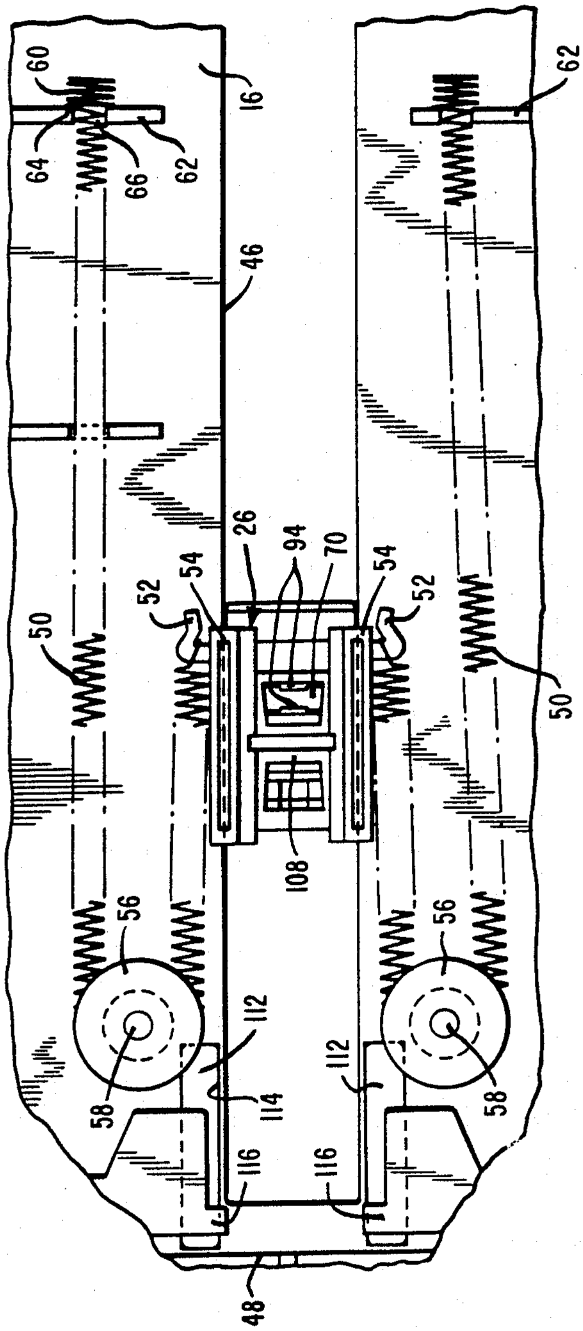
FIG. 3 is a view of the underside of a note support member of the currency cassette, showing also a number of parts associated with the note support member.

The pusher assembly 26 is arranged to engage with the edges of, and slide along, a longitudinally extending slot 46 formed in the support member 16. As shown in FIG. 3, which is a view of the underside of the support member 16, the pusher assembly 26 is urged toward the rear edge 48 of the support member 16 (which edge is positioned at the exit end of said cassette 10) by a pair of springs 50, corresponding ends of which are respectively attached to a pair of lugs 52 secured to portions 54 of the assembly 26 projecting beneath the support member 16. Each spring 50 passes round a respective pulley 56 rotatably mounted on a spindle 58 projecting beneath the support member 16 and positioned a short distance from the rear edge 48 thereof. That end of each spring 50 not attached to the respective lug 52 is formed as a portion 60 of enlarged diameter, this end being anchored to a respective fixed projection 62, located beneath the support member 16, by virtue of an annular shoulder 64 formed between the portion 60 and the contiguous part of the spring 50 engaging with the edge of a recess 66 formed in the respective projection 62. It should be understood that by using springs 50 constructed in this manner the assembly of the cassette 10 is simplified since the end portions 60 can be anchored to the projections 62 in a very simple manner without the end portions 60 having to assume any particular orientation relative to the projections 62.

Figure 4:
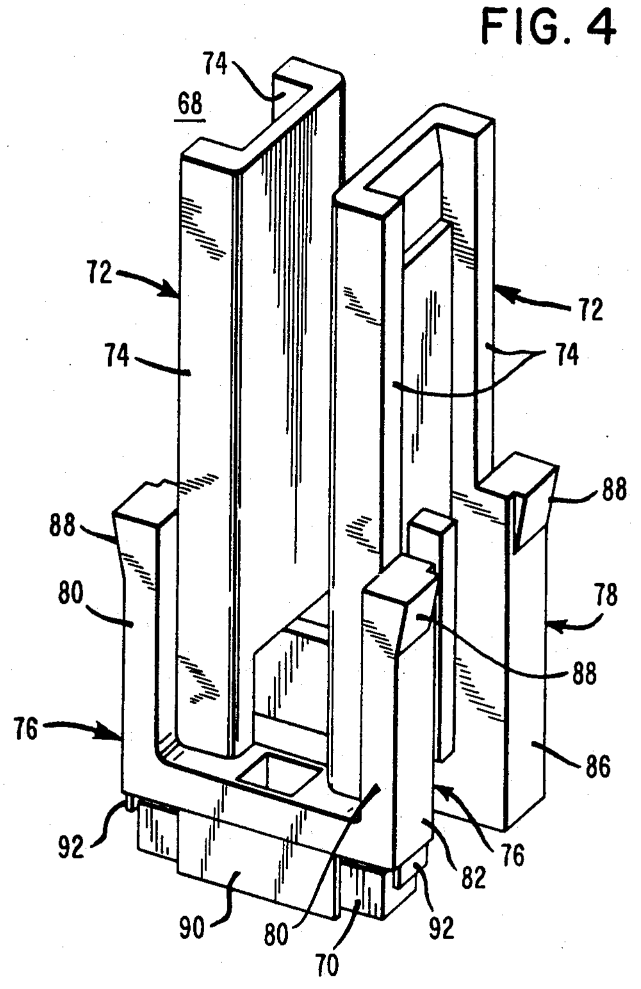
FIG. 4 is a greatly enlarged view of a magnet carrier member of the currency cassette.

The pusher assembly 26 has mounted therein a carrier member 68 of plastic material, best seen in FIG. 4, which is arranged to carry an elongated permanent magnet 70 extending in a direction transverse to the length of the slot 46. The carrier member 68 incorporates two vertically extending portions 72 of generally U-shaped cross-section. One pair of corresponding side walls 74 of the portions 72 extend upwardly from a first pair of corner portions 76, and the other pair of side walls 74 extend upwardly from a second pair of corner portions 78 (see also FIG. 5), the corner portions 76 and 78 being integral with the vertically extending portions 72. The corner portions 76 are provided with outwardly facing coplanar guide surfaces 80 which are parallel to the long edges of the magnet 70, and with further outwardly facing guide surfaces 82 which are parallel to each other and are at right angles to the guide surfaces 80. Similarly, the corner portions 78 are provided with outwardly facing coplanar guide surfaces 84 (FIG. 5) which are parallel to the guide surfaces 80, and with further outwardly facing guide surfaces 86 which are respectively coplanar with the guide surfaces 82. Each corner portion 76 or 78 is provided at its upper end with an angled projection 88 which slopes inwardly from the top of the corner portion 76 or 78 to the respective guide surface 82 or 86. The magnet 70 is located beneath the two corner portions 76, the magnet 70 being held in position by a pair of downwardly projecting side retainer members 90 and a pair of downwardly projecting end retainer members 92 formed integral with the remainder of the carrier member 68. A pair of inwardly projecting lips 94 (FIG. 3) provided on the lower edges of the side retainer members 90 project beneath the magnet 70 so as to hold the magnet 70 firmly in position.

Referring particularly to FIGS. 5 and 6, the pusher assembly 26 is provided with an inwardly facing planar guide surface 96 which is parallel to the long edges of the magnet 70. The inner surface 98 of the pusher plate 24 (which is the surface opposite the note engaging surface 99 of the pusher plate 24) acts as a further planar guide surface which is parallel to the guide surface 96. A pair of parallel guide walls 100 project inwardly from the guide surface 96, and a pair of parallel guide walls 102, respectively aligned with the guide walls 100, project inwardly from the guide surface 98. As shown in FIG. 6, a rectangular aperture 104 is formed in each of the guide walls 102 with the lower edge 106 of each aperture 104 being level with the tops of the guide walls 100. The carrier member 68 is removably and reversibly mounted in the pusher assembly 26 in one of two possible positions, the guide surfaces 96 and 98 and the guide walls 100 and 102 together defining a cavity in which the carrier member 68 is accommodated. Thus, as shown in FIG. 5, the carrier member 68 may be mounted in the pusher assembly 26 with the guide surfaces 80 of the corner portions 76 engaging with the guide surface 98, and with the guide surfaces 84 of the corner portions 78 engaging with the guide surface 96, the other guide surfaces 82 and 86 of the corner portions 76 and 78 engaging with the guide walls 100 and 102. Alternatively, the carrier member 68 may be reversed in position so that the guide surfaces 80 are in engagement with the guide surface 96 and the guide surfaces 84 are in engagement with the guide surface 98. It should be understood that, in each of its two possible positions, the carrier member 68 is held firmly mounted in the pusher assembly 26 by virtue of the lower end of the carrier member 68 engaging with a base portion 108 (FIG. 3) of the pusher assembly 26, and by virtue of the projections 88 of the corner portions 76 or of the corner portions 78 fitting in the apertures 104 with the upper surfaces of the relevant projections 88 engaging with the upper edges 110 of the apertures 104. With the carrier member 68 correctly mounted in the pusher assembly 26, the magnet 70 is located within, and extends across substantially the whole width of, the slot 46 in the note support member 16. In order to reverse the position of the carrier member 68 in the pusher assembly 26, all that is required is to press together the tops of the vertically extending portions 72 so as to disengage the relevant two latching projections 88 from the apertures 104, lift the carrier member 68 out of the pusher assembly 26, turn it through 180° about a vertical axis and then push the carrier member 68 back into the aforementioned cavity in the pusher assembly 26, the other two latching projections 88 snapping into the apertures 104.

The magnet 70 is arranged to cooperate with two elongated pole pieces 112 of a soft magnetic alloy which are respectively located in two recesses 114 (FIG. 3) formed in the underside of the rear part of the note support member 16 on either side of the slot 46, the pole pieces 112 being held in the recesses 114 by fastening means 116 of plastic material which also serve as support means for the brushes 42. The pole pieces 112 extend in a direction parallel to the length of the slot 46 with corresponding ends of the pole pieces 112 being positioned close to the rear edge 48 of the note support member 16 and with each pole piece 112 being positioned close to the adjacent edge of the slot 46. Typically, the pole pieces 112 have a length of 3.8 centimeters. A suitable material for the soft magnetic pole pieces 112 is a nickel alloy comprising 77% by weight nickel, 14% iron, 5% copper and 4% molybdenum, the alloy having a high permeability and a low coercivity. After fabrication, the pole pieces 112 are subjected to a heat treatment in order to develop the desired magnetic properties. This heat treatment involves heating the pole pieces 112° to 1120° C. for four hours in a furnace with a hydrogen atmosphere, and then cooling the pole pieces 112° to between 200° C. and 250° C. at a rate of 1° C. per minute, the flow of hydrogen being maintained during the cooling period.

Referring again to FIG. 2, the cash dispenser unit 30 includes a circuit board 118 mounted on a fixed support structure 120 adjacent the pick assembly 36. The circuit board 118 is so positioned that, when the currency cassette 10 is inserted into the cash dispenser unit 30, a free end 122 of the circuit board 118 enters into a cavity formed in the lower portion of the cassette 10 between the base 14 and the note support structure 16. A magnetically operable reed switch 124 is mounted on the upper surface of the circuit board 118 adjacent the free end 122. When the cassette 10 is fully inserted in the cash dispenser unit 30, the reed switch 124 is positioned between those end portions of the pole pieces 112 adjacent the rear edge 48 of the note support member 16, with the reed switch 124 extending across the major part of the width of the slot 46.

Figure 9:
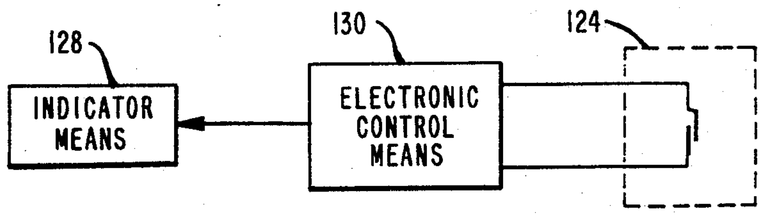
FIG. 9 is a schematic block diagram illustrating the electrical interconnections of a low level indication system with which the cassette is adapted to operate.

The manner of operation of the low level indication feature of the cassette 10 will now be described with additional reference to FIGS. 7-9. In operation of the cassette 10, the pusher plate 24 of the pusher assembly 26 pushes a stack of currency notes 126 against the note retaining member 22 positioned at the exit end of the cassette 10. As notes 126 are extracted one by one from the exit end of the cassette 10, the pusher assembly 26 will gradually move toward the retainer member 22. Depending on the positioning of the carrier member 68 in the pusher assembly 26, the cassette 10 will cause a low level indicator means 128 (FIG. 9) to be operated when the number of notes 126 remaining in the cassette 10 has been reduced to 250 notes (±50 notes) or 75 notes (±50 notes). As shown in FIG. 7, if the magnet carrier 68 is positioned in the pusher assembly 26 so that the magnet 70 is adjacent the pusher plate 24 (i.e. with the guide surfaces 80 of the corner members 76 engaging with the guide surface 98), then the low level indicator means 128 will be operated when the number of notes 126 remaining in the cassette 10 has been reduced to 250 notes. Alternatively, as shown in FIG. 8, if the magnet carrier 68 is positioned in the pusher assembly 26 so that the magnet 70 is remote from the pusher plate 24 (i.e. with the guide surfaces 84 of the corner members 78 engaging with the guide surface 98), then the low level indicator means 128 will be operated when the number of notes 126 remaining in the cassette 10 has been reduced to 75 notes. It should be understood that the low level indicator means 128 will be operated in each case when the magnet 70 reaches those ends of the pole pieces 112 remote from the rear edge 48 of the note support member 16, since at this time the magnetic field emanating from the magnet 70 and passing through the pole pieces 112 is strong enough in the vicinity of the reed switch 124 to cause the switch 124 to be closed. Closure of the switch 124 causes an electronic control means 130 (FIG. 9) included in the ATM to bring about operation of the indicator means 128. Operation of the indicator means 128 will serve to provide a warning that the currency cassette 10 requires replenishment or replacement by a full cassette. It will be appreciated that the bank or other organization responsible for operating the ATM incorporating the cassette 10 can choose whether the low level warning is given at a relatively high level (250 notes) or a relatively low level (75 notes). For example, it may be desired that a warning be given at a relatively high level if the ATM incorporating the cassette 10 is installed at a location remote from a central establishment where personnel responsible for replenishing or replacing the cassette 10 are situated and where the indicator means 128 is installed.

A further advantage of the low note indication system described above is that a low level warning can be given at a much higher level than would have been the case if the soft magnetic pole pieces 112 had not been included. Other advantages of the system are that, in operation, all low note detection components are located within the cassette 10, and no power is required for the cassette 10. Moreover, the system is of simple construction in that only one magnet and one sensor (reed switch 124) are required.

What is claimed is:

1. A currency cassette for containing a stack of currency notes, said cassette having an exit end through which said notes are dispensed and being adapted to be mounted in an operational position in a cash dispenser which has a magnetically operable switch for providing an indication of when the supply of bills in said cassette is low, comprising:

note support means for supporting a stack of currency notes;

pusher means having a note engaging surface arranged to engage with and urge said stack toward said exit end of said cassette from which currency notes are extracted one by one in operation when said cassette is in said operational portion;

magnet means capable of actuating said magnetically operable switch of the cash dispenser; and carrier means for carrying said magnet means and which is arranged to be removably mounted on said pusher means in a first position or a second position such that when said cassette is in said operational position, said magnet means operates said magnetically operable switch when said note engaging surface reaches either a first position or a second position relative to said exit end, depending upon the position in which said carrier means is mounted on said pusher means.

2. The currency cassette of claim 1, in which said cassette also includes first and second pole pieces of a soft magnetic material, said pole pieces extending away from said exit end from a position adjacent said exit end, said pole pieces being arranged to cooperate with said magnet means and said switch so as to provide a magnetic path for the magnetic field emanating from said magnet means when said switch is operated.

3. The currency cassette of claim 2, in which said pole pieces are respectively located in recesses formed in the underside of said note support means.

4. The currency cassette of claim 2, in which said cassette also includes spring means attached at one end to said pusher means and anchored at the other end within said cassette, said note support means being provided with an elongated slot along which said pusher means is caused to slide in operation toward said exit end under the action of said spring means, said pole pieces being respectively located adjacent the long edges of said slot.

5. The currency cassette of claim 4, in which said magnet means is of elongated configuration, said magnet means being carried by said carrier means in a position such that said magnet means is located within said slot and extends transverse to the length of said slot.

6. The currency cassette of claim 2, in which said carrier means includes first and second manually operable members having end portions and latching means integral with said manually operable members, which are arranged to engage with said pusher means for the purpose of holding said carrier means in said pusher means, said carrier means being removable from said pusher means by pressing together said end portions of said manually operable members so as to disengage said latching means from said pusher means.

7. The currency cassette of claim 6, in which said pusher means includes a cavity in which said carrier means is accommodated, and in which said carrier means can be changed from one to the other of its two possible positions relative to said pusher means by disengaging said latching means from said pusher means, lifting said carrier means from said cavity, turning said carrier means through 180 degrees about a vertical axis, and replacing said carrier means in said cavity.

8. The currency cassette of claim 1, in which said magnet means comprises a permanent magnet.

9. The currency cassette of claim 1, in which said note support means is of plastic material.

10. The currency cassette of claim 1, in which said carrier means is of plastic material.

11. A cash dispensing system comprising:

a currency cassette for containing a stack of currency notes and having an exit end from which said notes are extracted, said cassette including note support means for supporting a stack of currency notes, pusher means having a note engaging surface arranged to engage with and urge said stack toward said exit end, magnet means and carrier means carrying said magnet means and arranged to be removably mounted on said pusher means in a first position or a second position, and cash dispensing means including means for extracting currency notes one by one from the note exit end of said cassette when said cassette is mounted in an operational position in said cash dispensing means, and a magnetically operable switch operable by said magnet means of the currency cassette when said note engaging surface of said pusher means reaches a first position or a second position relative to said exit end, depending upon the position in which said carrier means is mounted on said pusher means, operation of said switch serving to bring about operation of low level indication means so as to provide a warning that the number of notes remaining in said cassette has reached a predetermined first level or second level.

12. The system of claim 11, in which said cassette also includes first and second elongated pole pieces of a soft magnetic material extending away from said exit end from a position adjacent said exit ends, said pole pieces being arranged to cooperate with said magnet means and with said switch so as to provide a magnetic path for the magnetic field emanating from said magnet means for operation of said switch.

13. The system of claim 12, in which said switch is positioned so as to enter a cavity in the lower portion of said cassette when said cassette is mounted in said operational position in said cash dispensing means, said cavity being located immediately beneath said note support means.

14. The system of claim 11, in which said magnet means comprises a permanent magnet.

15. The system of claim 12, in which said note support means is of plastic material.

* * * * *